(12) United States Patent
McMullen et al.

(10) Patent No.: US 9,537,827 B1
(45) Date of Patent: *Jan. 3, 2017

(54) SECURE MODE VLANS SYSTEMS AND METHODS

(71) Applicant: NETAPP, INC., Sunnyvale, CA (US)

(72) Inventors: Marshall McMullen, Boulder, CO (US); Peter P. Waskiewicz, Jr., Portland, OR (US); Derek Leslie, Portland, OR (US)

(73) Assignee: NETAPP, INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/977,021

(22) Filed: Dec. 21, 2015

(51) Int. Cl.
| | |
|---|---|
| *G06F 9/00* | (2006.01) |
| *G06F 15/16* | (2006.01) |
| *G06F 17/00* | (2006.01) |
| *H04L 29/06* | (2006.01) |
| *H04L 12/46* | (2006.01) |

(52) U.S. Cl.
CPC ....... *H04L 63/0227* (2013.01); *H04L 12/4641* (2013.01); *H04L 67/42* (2013.01)

(58) Field of Classification Search
CPC .................................................. H04L 63/0227
USPC .......................................................... 726/15
See application file for complete search history.

(56) References Cited

U.S. PATENT DOCUMENTS

| | | |
|---|---|---|
| 6,604,155 B1 | 8/2003 | Chong, Jr. |
| 2003/0028642 A1 | 2/2003 | Agarwal et al. |
| 2004/0107281 A1 | 6/2004 | Bose et al. |
| 2004/0133622 A1 | 7/2004 | Clubb et al. |
| 2011/0238857 A1 | 9/2011 | Certain et al. |

*Primary Examiner* — Dant Shaifer Harriman
(74) *Attorney, Agent, or Firm* — Foley & Lardner LLP

(57) ABSTRACT

A method includes binding, using a plurality of processors, a process to a wildcard address and a port on each of a plurality of nodes. The process receives, on a redirector node, a first request for a first address of a first volume located on the cluster from a first client. The first request is sent to the port and a first address associated with a first virtual local area network (VLAN) that is not the wildcard address. The process determines the first address from the first request and a name of the first VLAN based on the first address. The process determines a first node that contains information regarding the first volume and an address of the first node that is part of the first VLAN. The process determines that a volume identifier associated with the first volume of the first request is present on a volume list.

20 Claims, 4 Drawing Sheets

US 9,537,827 B1

SECURE MODE VLANS SYSTEMS AND METHODS

BACKGROUND

Virtual local area networks (VLANs) allow various remote-computing systems to communicate as if they resided on a common local area network. Accordingly, network security measures can ensure secure communication occurs between the various remote-computing systems, even if the communication occurs over an otherwise unsecured network. Combined with a VLAN, internet small computer system interface (iSCSI) allows volumes on a storage system to be accessed in a secure way. iSCSI provides an abstraction of where a volume of data is stored on the storage system. To create a connection, a device issues a discovery request for a particular volume to an iSCSI target. In response to this discovery request, the iSCSI target determines where the volume is located and provides the IP address of where the volume is located. This allows an end user to access a volume of data without having to know, prior to accessing the data, where the data is actually located. This process is called iSCSI redirection.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims. Like reference numbers and designations in the various drawings indicate like elements.

DETAILED DESCRIPTION OF EXAMPLE EMBODIMENTS

Overview

Figure 1:
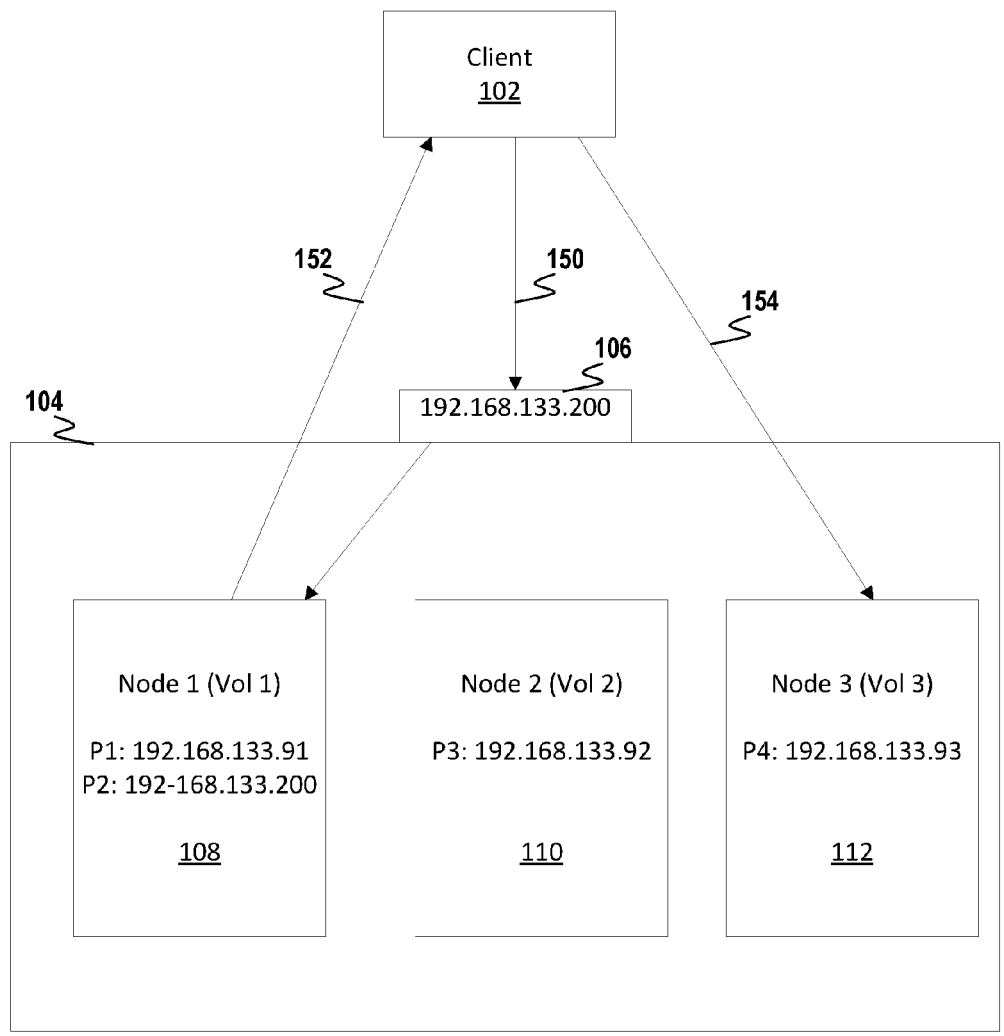
FIG. 1 depicts a storage system supporting iSCSI redirection.

In general, one aspect of the subject matter described in this specification can be embodied in a method that includes binding, using a plurality of processors, a process to a wildcard address and a port on each of a plurality of nodes that are part of a cluster. The method further includes receiving, by the process on a redirector node, a first request for a first address of a first volume located on the cluster from a first client. The first request is sent to the port and a first address associated with a first virtual local area network (VLAN) that is not the wildcard address. The method further includes determining, by the process on the redirector node, the first address from the first request. The method further includes determining, by the process on the redirector node, a name of the first VLAN based on the first address. The method further includes determining, by the process on the redirector node, a first node that contains information regarding the first volume. The method further includes determining, by the process on the redirector node, an address of the first node that is part of the first VLAN based upon the name of the first VLAN. The method further includes determining, by the process on the redirector node, that a volume identifier (ID) associated with the first volume of the first request is present on a volume list. The method further includes returning, by the process on the redirector node, the address of the first node to the first client.

Another aspect of the subject matter described in this specification can be embodied in systems that include a cluster. The cluster includes a plurality of nodes, including a redirector node. Each node includes a process bound to a wildcard address and a port. The process on the redirector node is configured to receive a first request for a first address of a first volume located on the cluster from a first client. The first request is sent to the port and a first address associated with a first virtual local area network (VLAN) that is not the wildcard address. The process on the redirector node is further configured to determine the first address from the first request. The process on the redirector node is further configured to determine a name of the first VLAN based on the first address. The process on the redirector node is further configured to determine a first node that contains information regarding the first volume. The process on the redirector node is further configured to determine an address of the first node that is part of the first VLAN based upon the name of the first VLAN. The process on the redirector node is further configured to determine that a volume identifier (ID) associated with the first volume of the first request is present on a volume list. The process on the redirector node is further configured to return the address of the first node to the first client.

Another aspect of the subject matter described in this specification can be embodied in a non-transitory computer-readable medium having instructions stored thereon, that when executed by a computing device cause the computing device to perform operations including binding a process to a wildcard address and a port on a redirector node that is part of a cluster. The operations further include receiving a first request for a first address of a first volume located on the cluster from a first client. The first request is sent to the port and a first address associated with a first virtual local area network (VLAN) that is not the wildcard address. The operations further include determining the first address from the first request. The operations further include determining a name of the first VLAN based on the first address. The operations further include determining a first node that contains information regarding the first volume. The operations further include determining an address of the first node that is part of the first VLAN based upon the name of the first VLAN. The operations further include determining that a volume identifier (ID) associated with the first volume of the first request is present on a volume list. The operations further include returning, by the process on the redirector node, the address of the first node to the first client.

The foregoing summary is illustrative only and is not intended to be in any way limiting. In addition to the illustrative aspects, implementations, and features described above, further aspects, implementations, and features will become apparent by reference to the following drawings and the detailed description.

DETAILED DESCRIPTION

VLAN Storage Systems

FIG. 1 depicts a storage system 104 supporting iSCSI redirection. The storage system 104 includes nodes 108, 110, and 112. Each node can contain information about one or more volumes of data. For example, node 3 112 includes data associated with a volume 3. This data can include information regarding where data stored on the volume is located. The volume's data can be stored across different nodes. In one implementation, the volume's data is stored randomly across all nodes of the storage system 104. Multiple different clients can access the storage system. These clients can be independent of one another. Data associated with each client, therefore, is inaccessible by other clients. One way to ensure that client data stays separate from one another is to use a separate VIP for each client. In this implementation, each VIP is for a cluster of nodes. While the nodes used in various client clusters can overlap, the data stays separated due to the use of different VIPs. For example, a client that accesses the cluster using VIP 106 would not be able to authenticate with a different VIP (not shown in FIG. 1). Accordingly, the client would only be able to access volumes on the cluster associated with the client.

Each volume can be accessed using iSCSI. An end user can use a computing device 102 to access a volume associated with the end user. For example, the client 102 can access volume 3. To do this, the client must now know an IP address 106 that is associated with the storage system 104. A virtual IP address (VIP) is used for this purpose. This IP address is considered to be virtual as the physical device that receives data destined to the VIP changes. An iSCSI initiator, such as the client 102, initially connects to the VIP address 106 as an endpoint. To support iSCSI functions, the VIP address 106 has responsibility for handling all initial iSCSI requests from multiple clients. The actual node or other computing system that is the actual physical destination of this address can change. For example, the hosting computing device can be changed to balance the load from handling iSCSI functions. Importantly, only a single node will host the VIP at any one time. Whichever node handles data received on the VIP listens on a defined port, e.g., 3260, on the VIP for incoming iSCSI requests.

Allowing various nodes to act as the endpoint of the VIP ensures that if the node that is currently hosting the VIP crashes another node can become the VIP. From the customer's perspective, the VIP is always available and the customer does not have to know which node is acting as the VIP. Accordingly, the VIP is the address that the client 102 uses to connect to iSCSI storage.

One function of the VIP is to direct a client to the node that stores a requested volume. This allows a volume to reside on a different node than the node currently acting as VIP. For example, FIG. 1 illustrates the client 102 requesting access to volume 3. Initially, the client 102 sends a request to the VIP (150). In FIG. 1, node 108 is acting as the VIP so the request is handled by node 108. Node 1 determines which node handles I/O requests for volume 3. For example, a database can store a mapping of volume names to node names or IP addresses. In this example, node 112 handles I/O requests for volume 3. Accordingly, node 108 sends a redirect response to the client 102 that includes the IP address of node 112, e.g., 192.168.133.93, and port that accepts iSCSI commands for volume 3 (152). Upon receipt, the client 102 then performs a new login directly to node 112 (154).

Figure 2:
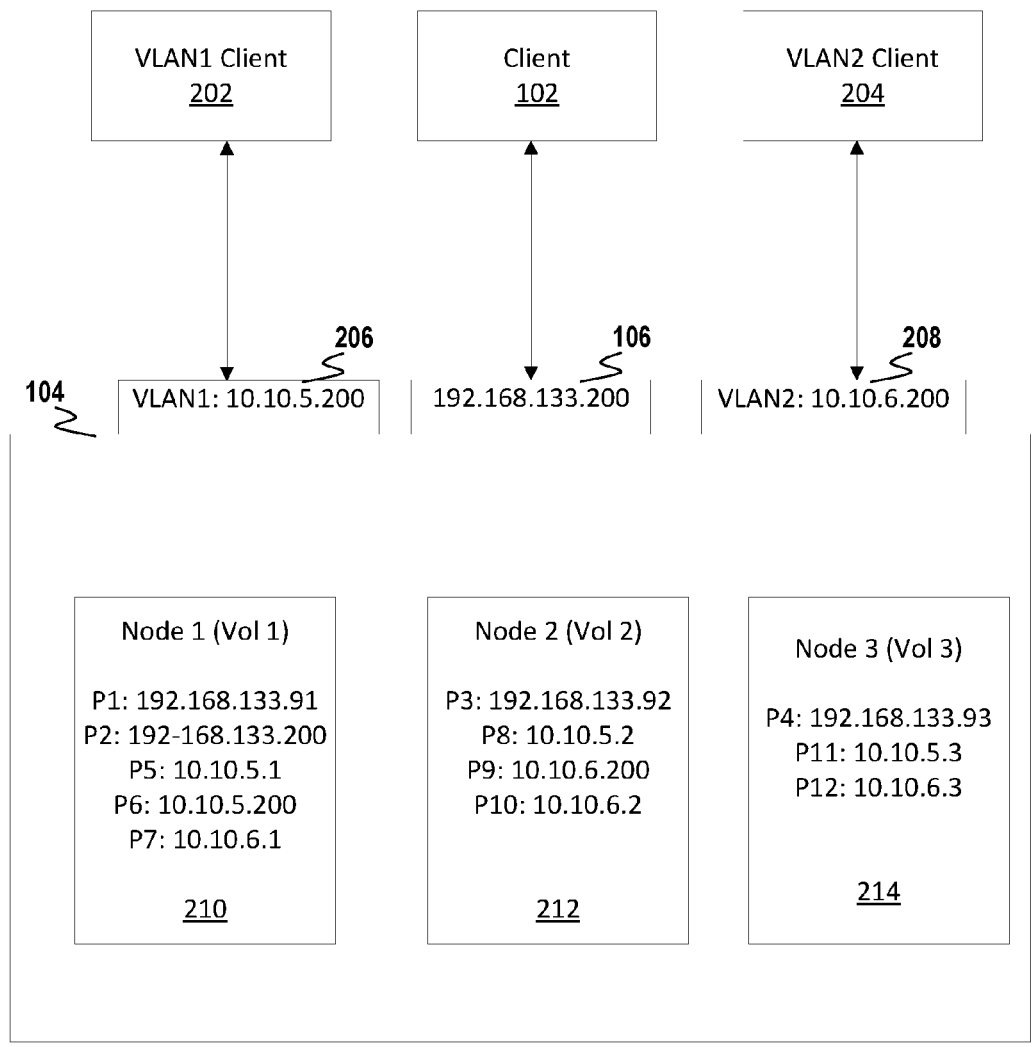
FIG. 2 depicts a storage system supporting iSCSI redirection with multiple VLANs.

This redirection involves two separate types of processes. The first is the VIP process. The second type of process is the process that listens for iSCSI commands that occur on a particular network. In FIG. 1, each node has one process that acts as the iSCSI listening process. Each process listens for iSCSI commands to access volumes that the node hosts. If a particular volume is not hosted on the current node, the node can redirect an iSCSI initiator to the correct node. Note, this is different than the VIP process that redirects iSCSI initiators to the correct node. Rather, each iSCSI listening process can also redirect iSCSI initiators to account for volumes that move from one node to another node. Accordingly, one main difference between the two types of processes is that each iSCSI listening process is not intended to be a redirector process that all clients initially communicate. The VIP process is the process that all clients initially connect to when trying to access a particular volume.

iSCSI redirection can be used in combination with VLANs. FIG. 2 depicts a storage system 204 supporting iSCSI redirection with multiple VLANs. Specifically, the storage system 204 includes three different iSCSI endpoints, VLAN1, a cluster, and VLAN2. A client 202 can use VIP 106 to access volumes on the client's cluster. This is accomplished as described in FIG. 1. In contrast to FIG. 1, FIG. 2 includes two VLANs. Each VLAN is required to have a dedicated VLAN network interface configured on every node with a dedicated VLAN IP address specific to that VLAN. Different network interfaces for each VLAN ensures that packets from different networks are isolated from one another. All incoming and outgoing traffic for a VLAN must come in and go out over the dedicated interface and IP address associated with that VLAN. In addition, VLAN traffic cannot see non-VLAN traffic or traffic on a different VLAN. To ensure this separation of VLAN data, FIG. 2 adds two additional VIPs, one for VLAN1 206 and one for VLAN2 208. Accordingly, a VLAN1 client 202 can access its cluster using VIP 206. Similarly, a VLAN2 client 204 can access its cluster using VIP 208.

In addition to adding VIPs 206 and 208, each node must also include one iSCSI listening process for each VLAN. A VIP process is also needed for each VLAN. In FIG. 2, processes P1, P3, and P4 are the iSCSI listening processes for a cluster of nodes. Processes P5, P8, and P11 are the iSCSI listening processes for VLAN1, while P7, P10, and P12 are the iSCSI listening processes for VLAN2. P2 on node 210, P6 on node 210, and P9 on node 212 are the VIP processes for the cluster, VLAN1, and VLAN2, respectively.

The approach shown in FIG. 2 segregates traffic from different VLANs using separate processes. Adding a new VLAN, therefore, increases the number of processes that operate on each node. For a small number of VLANs, this does not pose difficulty. A large number of supported VLANs, e.g., 100s or 1,000s, however, begin to tax system resources significantly. The large number of processes can lead to contention issues as well as extensive memory overhead. Further, each process requires additional threads and sockets. Further, adding and deleting VLANs is also a problem. A storage system with a large number of nodes requires that a process be added to each of the nodes. This makes adding VLANs dynamically unworkable. For example, race conditions would be common in trying to atomically create a process on each of the nodes. Further, how IP addresses are apportioned also becomes an issue.

Figure 3:
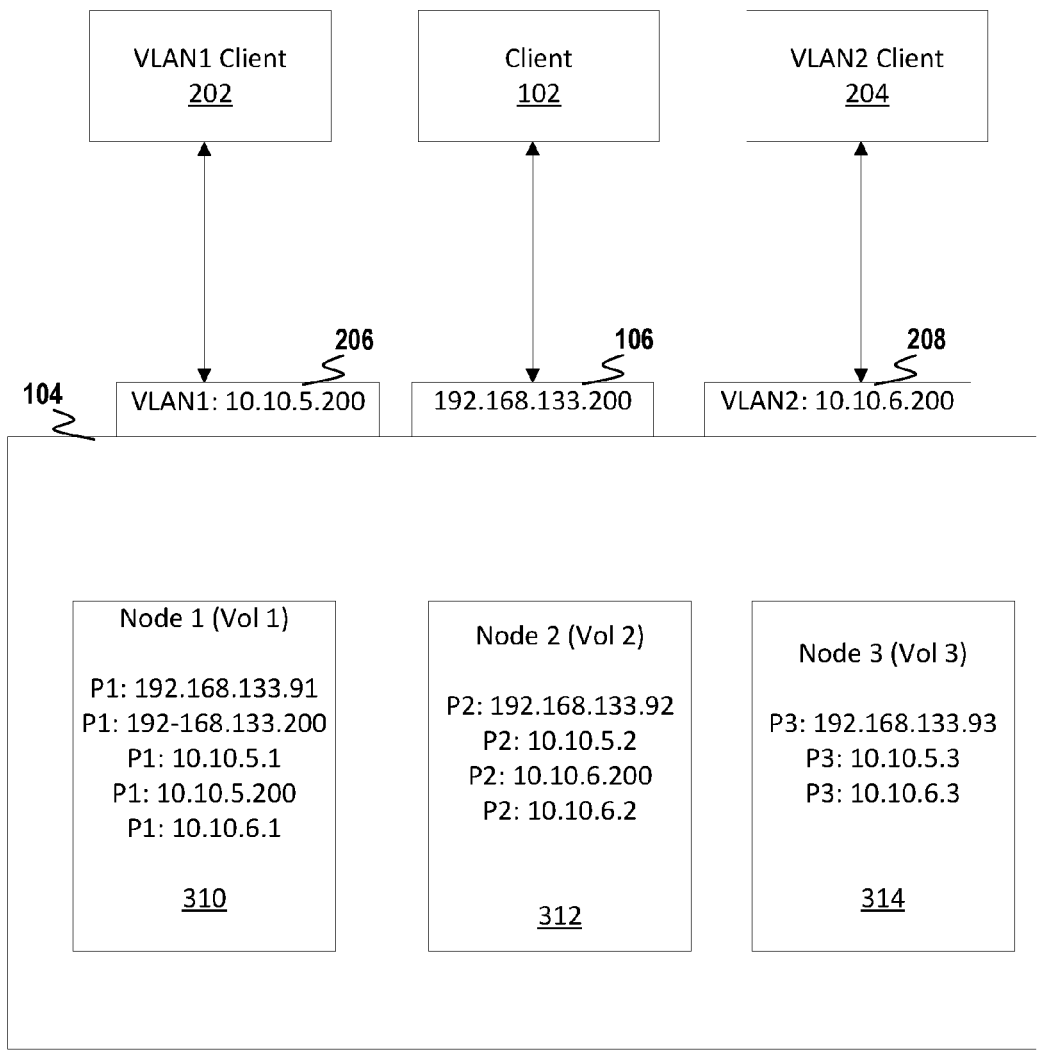
FIG. 3 depicts a storage system supporting iSCSI redirection with multiple VLANs in accordance with an illustrative embodiment.

FIG. 3 depicts a storage system supporting iSCSI redirection with multiple VLANs according to one embodiment. In FIG. 3, a single wildcard process exists on each node. This process operates as a VIP for any VLAN or cluster, and an iSCSI listening process for every cluster and VLAN. To achieve this is to use an IP address that is bound to every interface of a machine. For example, the IPADDR_ANY IP address can be used, e.g., 0.0.0.0 or ::. In this way, one process listens across all network interfaces of a machine on a particular socket, e.g., 3260. In various implementations, the iSCSI traffic uses different IP addresses to differentiate between VLANs but uses the same port. If different ports are used, one process is needed for every distinct port. The IPADDR_ANY IP address acts as a wildcard address that a process can listen on so that the process will receive all packets destined for any interface on a particular port on the machine. The physical and virtual interfaces, however, are still separate. Incoming traffic into a node still stays on its own interface. Only at the final layer in the kernel is all of the incoming traffic collapsed down to the one process listening on the one socket bound to IPADDR_ANY. The VLAN requirement that data is segregated across different VLANS, therefore, is achieved.

Using the IPADDR_ANY address, therefore, allows a single process to run on every node. This one process handles all cluster and VLAN traffic. In addition, the iSCSI listening process can also be combined with the VIP process. Accordingly, regardless of how many VLANs are supported in the storage system, each node only has a single process. This one process also handles all non-VLAN packets. Note, each VLAN and cluster has its own unique IP address that is used by external clients to access volumes on a VLAN or cluster.

As noted above, the approach illustrated in FIG. 3 keeps VLAN traffic properly segregated. Accordingly, the security of any VLAN is maintained. No customer iSCSI data passes over the unfiltered catch-all wildcard interface and socket. As the wildcard interface can receive data related to different VLANs, the wildcard process must determine how to properly handle iSCSI requests and data. A database can be used to store data used to properly route packets. The database can include data about each volume and node in the storage system. Using this information, the redirector portion of the wildcard process can lookup which node is hosting that volume. Next, all of the IP addresses of that node can be determined.

Repeating the example from FIG. 1, a client can log in to volume 3. A discovery request is sent from VLAN1 client to access volume 3. The client sends the packet to VLAN1's IP address 10.10.5.200. If node 1 is the VIP of VLAN1, the discovery request is handled by the one wildcard process running on node 1. Volume 3 is located on node 3. The issue, though, is what IP address should be returned, as node 3 is addressable by three IP address: 192.168.133.93 for the cluster; 10.10.5.3 for VLAN 1; and 10.10.6.3 for VLAN2. Previously, there was one process for each interface. Accordingly, the return address would be known as there was one process for each VLAN, e.g., for each of the three IP address. Now, as there is a single process running, the correct IP address to return must be determined.

To determine the correct IP address to return, the local endpoint that the packet arrived on can be determined. For example, a getsockname( ) method call can be made. In the example above, the traffic was received on VLAN1's VIP, so 10.10.5.200 would be returned. Using this information, the name of the VLAN can be determined from the database. In addition, volume 3 can be determined to be located on node 3. Next, using the name of the VLAN, the IP address on node 3 associated with VLAN1 can be determined, i.e., 10.10.5.3. This is the address that is returned to the client. The client can then connect directly to 10.10.5.3 to access volume 3.

When the client accesses data in volume 3, the wildcard process handles the IO requests. As these requests are not iSCSI discovery requests, an iSCSI listener counterpart of the wildcard process processes the request. This portion of the wildcard process determines the IP address that the client used to connect to node 3. Using this information, the wildcard process can verify that the client is able to connect to the VLAN.

In addition to the reduction of processes needed to support VLANs, the various implementations allow VLANs to be atomically configured. To add a VLAN to a cluster, one or more blocks of IP addresses are received from a client device. For example, a VLAN setup process can receive the block of IP addresses. In addition, a name of the new VLAN and requested VIP of the VLAN can be received. The IP addresses are used to assign to each node one IP address. Each IP address associated with the new VLAN cannot be currently in use in the cluster. To ensure that the VLAN can be created, all currently used IP addresses in the block of IP addresses can be filtered or marked as being in use. The number of unused IP addresses can then be determined. If the number of unused IP addresses is less than the number of nodes in the cluster, the VLAN cannot be setup. In this scenario, a message indicating that a different block of IP addresses is required to setup the VLAN can be returned to the client device. If the number of IP addresses is greater than or equal to the number of nodes in the cluster, the setup of the VLAN can continue, A database that supports atomic functions is used to atomically setup the VLAN. The IP address assigned to each node and an identifier of the node are stored in the database. This allows the IP address for this VLAN to be determined for each node in the cluster. This atomic feature ensures that if nodes are added to a cluster at the same time a VLAN is being added, the VLAN will be successfully setup with the new node. If the VLAN is not at first successfully installed because a new node was added before the VLAN was successfully added, attempting to add the new VLAN can be retried. In this scenario, as long as no new node was added, an existing node is removed, or using one IP address is duplicated, the adding will be successful. Once a VLAN is added to the database, network interfaces for each node can be created and bound to the appropriate port. In addition, the VIP of the VLAN is bound to an initial node and listens for iSCSI discovery requests on the new VLAN.

Another benefit of this configuration is that numerous different clients can use the storage system. A single client can itself have multiple customers. The client, however, may need to ensure that each customer's data is separate and secure from each other customer. This can be accomplished by providing each customer with its own VLAN. As described above, data in one VLAN is segmented from data in each and every other VLAN.

Secure Mode VLANs

In a VLAN system, for example, implemented in and discussed above with respect to FIG. 3, since a wildcard address is used at each node or volume, the listening node can potentially receive any discovery requests for data (or a volume) from any of the VLAN1 Client 202, the Client 102, and/or the VLAN2 Client 204. As discussed above, node receiving the discovery request also determines the correct IP address for returning the results of the request using the getsockname( ) method call. The address of the data/volume requested by the client can then be returned to the client to redirect the client to the appropriate node and initiate an iSCSI request to access the data. The iSCSI procedure can prevent a client from accessing data/volumes that they do not have access to. However, since a node can receive and return discovery requests from multiple clients, a discovery request response could potentially refer to data/volume that is not authorized to be accessed by a particular client. That is, since the nodes in FIG. 3 operate using a single process that listens for various requests from various clients, those nodes are not limited to determining the location of data/volumes in response to discovery requests for a single client. Even though after answering a request and redirecting a client the client would not be able to access data that is not theirs because of the iSCSI procedure, a client may be able to see that data/volumes they are not authorized to access exist as well as the location of such data. In other words.

Figure 4:
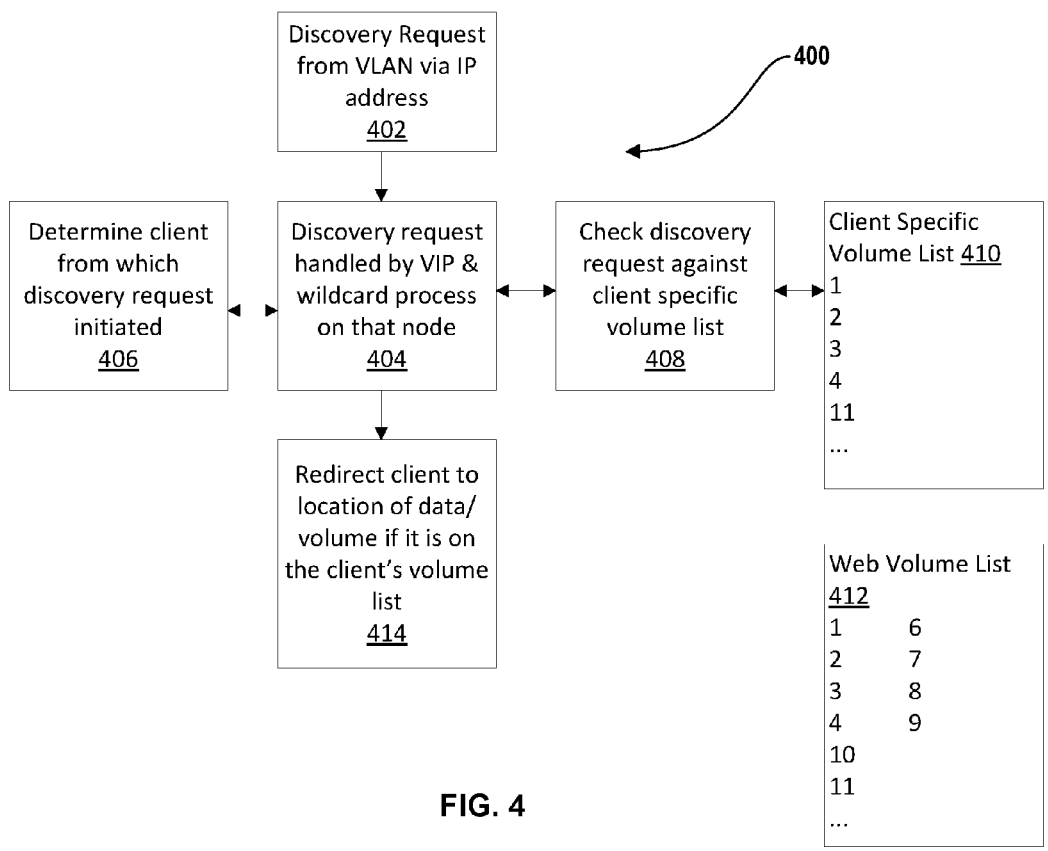
FIG. 4 depicts a flow diagram for a method of supporting iSCSI redirection with multiple VLANs with a secure mode in accordance with an illustrative embodiment.

FIG. 4 depicts a flow diagram for a method 400 of supporting iSCSI redirection with multiple VLANs with a secure mode in accordance with an illustrative embodiment. In alternative embodiments, fewer, additional, and/or different steps may be performed. Also, the use of a flow diagram is not meant to be limiting with respect to the order of steps performed.

In an operation 402, a discovery request for a data/volume is originated at a client. As one example, the discovery request may originate from VLAN1 Client 202 as shown in and described with respect to FIG. 3. Similar to the sequence shown in and described with respect to FIGS. 1, 2, and 3 above, the discovery request may be for data/volume located on a third node, for example the node 314 of FIG. 3. However, a different node, for example the node 310 of FIG. 3, may be the VIP of the VLAN1 Client 202. Accordingly, the discovery request from the VLAN1 Client 202 will be handled by a wildcard process on the node 310 in an operation 404.

In the operation 404, and as described above with respect to FIG. 3, the VIP can determine a correct IP address to return the results of the request to. In this example, the node 310 would determine that the discovery request originated with the VLAN1 Client 202 and, after determining where the volume/data that is the subject of the request is stored, and send back to the VLAN1 Client 202 the location of the data/volume on the node 314. This determination occurs in an operation 406.

However, prior to returning the location of the requested data/volume to the client (and subsequently redirecting the client to the third node to initiate an iSCSI procedure to retrieve the data/volume from the third node), the first node 310 checks the discovery request against a client specific volume list 410 in an operation 408. The client specific volume list 410 is an index or database of every volume that the VLAN1 Client 202 has access to. Some of the volumes may be exclusive to the VLAN1 Client 202, and other volumes may be accessible by the VLAN1 Client 202 and other clients. Still other volumes may be accessible by other clients and not the VLAN1 Client 202. In this scenario, such a volume would not appear on the client specific volume list 410 for the VLAN1 Client 202. In alternative embodiments, a client's specific volume list may include multiple client specific volume lists that are checked when a discovery request is made. For example, if a client is part of different groups/security domains that grant access to different data/volumes, the client may essentially have multiple specific volume lists. In practice, when authorizing a discovery request, the system may combines each of these volume lists to run a single check, or similarly may check each volume list in sequence to determine whether the client should be authorized to request location information (volume ID) for particular data/volumes. In some embodiments, the system may not check an entire client specific volume list or lists. For example, if the system finds a match on the client specific volume list(s), it is not necessary to check the rest of the volume list(s). Such a method can preserve resources in the system.

FIG. 4 also shows a web volume list 412. While the client specific volume list 410 shows volume IDs assigned to or accessible to the VLAN1 Client 202, the web volume list shows all of the volume IDs that exist in a storage system (e.g., the storage system 104 of FIGS. 1-3). Accordingly, every volume ID that has something stored on the storage system is shown in the web volume list, regardless of what node the volume is stored on or how many nodes there are. The volume IDs refer to specific physical memory locations. Accordingly, whatever is stored in the specific locations can be indicated by the volume ID. The volume IDs on the client specific volume list 410 all appear on the web volume list 412 (e.g., 1, 2, 3, 4, 11). The web volume list 412 also includes volume IDs that are not on the client specific volume list 410 that are not allocated to or accessible to the VLAN1 Client 202 (e.g., 6, 7, 8, 9, 10). Since they are on the web volume list 412, however, they are accessible to at least one other client and/or VLAN. Similarly, volume IDs that occur on both the web volume list 412 and the client specific volume list 410 may be on other clients/VLANs volume list, and thus accessible to those other clients/VLANs. This may occur where clients store identical volumes, and thus it is more efficient for the storage system to store only one instance of the data. Other volume IDs that can store data/volumes in a storage system may be empty and do not currently contain data (e.g., 5). Such volume IDs may have previously had data stored there, but may have been removed by a garbage collector process after a determination that no clients are linking to the data at a particular volume ID. If a discovery request includes a request for data at the volume ID 5, for example, the system may return an error message, dynamically store/create new data at the volume ID, or run a process to determine if the requested data is actually stored somewhere else (located at a different volume ID).

As discussed above, at the operation 408, the node determines if the data/volumes requested in the discovery request are on the client specific volume list 410, where the client is determined at the operation 406. Determining whether the data/volumes are on the client specific volume list 410 occurs before the client is redirected to the actual location of the data/volumes at an operation 414. The operation 408 occurs before the operation 414 to ensure that information about a volume or about redirection to a volume location that a client is not authorized for is not sent to that client.

Further, at the operation 414, the client can be redirected by information from the node as disclosed herein to retrieve and/or access the data/volumes sought in the discovery request. For example, the operation 414 may initiate an iSCSI process for accessing and retrieving data from the third node 314. Such a process may be similar to that of FIG. 1, where, as discussed above, the node 310 (after verification at the operation 408) sends a redirect response to the VLAN1 Client 202 that includes the IP address of the node 314 port that accepts iSCSI commands for the volume sought to be accessed. This redirect response is demonstrated, for example, by 152 of FIG. 1. Upon receipt, the VLAN1 Client 202 can perform a new login directly to the node 314. This direct login is demonstrated, for example by 154 of FIG. 1.

The systems and methods disclosed herein offer flexibility and security for storage systems. For example, VLANs for multiple clients can be grouped together to allow volumes to visible to different VLANs. For example, groups/security domains of clients that are part of a single entity may have access to all of the same volumes. In another example, subsets of a group/security domain of clients may have access to all of the same volumes. As a result, multiple grouped clients could use a common VLAN when accessing a storage system as disclosed herein, which would result in secure use of the storage system for the group of clients without requiring a multitude of separate VLANs for each client device.

Further, groupings of clients can be leveraged to maintain and use fewer client specific volume lists. This could occur regardless of whether clients are grouped together to use a common VLAN. In this example, multiple grouped clients would have discovery requests that originate from those clients checked against the same client specific volume list. As such, the list may be more accurately characterized as a client grouping specific volume list or a security domain specific volume list. Using one volume list for multiple clients is advantageous in that the storage system stores and maintains fewer volume lists for a given number of clients (fewer compared to having one volume list for every client). In these grouping embodiments, the clients should be grouped (either through a common VLAN and/or by associating multiple VLANs with a common volume list) before discovery requests are made. This ensures that once a discovery request is made, the system checks the discovery list against an appropriate volume list that indicates whether the client should be sent information relating to the requested data/volumes and their respective locations.

Advantageously, the systems and methods described herein also define a security/authentication for the network layer of the system, rather than the iSCSI layer where data is actually accessed. This adds another layer of security and protection for clients storing data on the storage system.

Advantageously, as described herein, methods and systems can be provided to prevent nodes from answering requests from clients in a way that would provide information to clients about data/volumes that those clients are not authorized to access. This procedure can be used even if different clients have access to some common volumes, which is particularly helpful for groups of clients or security domains that share some common data.

One or more flow diagrams have been used herein. The use of flow diagrams is not meant to be limiting with respect to the order of operations performed. The herein-described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A method comprising:
   binding, using a plurality of processors, a process to a wildcard address and a port on each of a plurality of nodes that are part of a cluster;
   receiving, by the process on a redirector node, a first request for a first address of a first volume located on the cluster from a first client, wherein the first request is sent to the port and a first address associated with a first virtual local area network (VLAN) that is not the wildcard address;
   determining, by the process on the redirector node, the first address from the first request;
   determining, by the process on the redirector node, a name of the first VLAN based on the first address;
   determining, by the process on the redirector node, a first node that contains information regarding the first volume;
   determining, by the process on the redirector node, an address of the first node that is part of the first VLAN based upon the name of the first VLAN;
   determining, by the process on the redirector node, that a volume identifier (ID) associated with the first volume of the first request is present on a volume list; and
   returning, by the process on the redirector node, the address of the first node to the first client.

2. The method of claim 1, wherein determining that the volume ID is present on the volume list occurs before returning the address of the first node to the first client.

3. The method of claim 1, further comprising grouping, by the plurality of processors, a plurality of clients into a security domain.

4. The method of claim 3, wherein any client included in the security domain is authorized to receive addresses associated with volumes located on the cluster.

5. The method of claim 3, wherein grouping the plurality of clients occurs before determining that the volume ID associated with the first volume of the first request is present on the volume list.

6. The method of claim 1, wherein the first volume is accessible only by the first client.

7. The method of claim 1, wherein the first volume is accessible by the first client and at least a second client.

8. The method of claim 1, wherein the volume list comprises a plurality of volume IDs that indicate that the first client is authorized to access volumes associated with the plurality of volume IDs.

9. The method of claim 1, further comprising receiving, at the process on the first node, a request from a first client to access the first volume.

10. The method of claim 9, wherein the redirector node is the first node.

11. The method of claim 9, wherein the redirector node is different from the first node.

12. The method of claim 1, further comprising initiating an iSCSI discovery request for the first volume based on the address of the first node.

13. The method of claim 1, where the first address is an internet protocol address.

14. A system comprising:
   a cluster comprising a plurality of nodes, including a redirector node, wherein each node comprises:
      a process bound to a wildcard address and a port;
   the redirector node, wherein the process on the redirector node is configured to:
      receive a first request for a first address of a first volume located on the cluster from a first client, wherein the first request is sent to the port and a first address associated with a first virtual local area network (VLAN) that is not the wildcard address;
      determine the first address from the first request;
      determine a name of the first VLAN based on the first address;
      determine a first node that contains information regarding the first volume;
      determine an address of the first node that is part of the first VLAN based upon the name of the first VLAN;
      determine that a volume identifier (ID) associated with the first volume of the first request is present on a volume list; and
      return the address of the first node to the first client.

15. The system of claim 14, wherein the volume list comprises a plurality of volume lists corresponding to a plurality of security domains.

16. The system of claim 15, wherein the plurality of volume lists corresponding to the plurality of security domains authorize the first client to access a plurality of volumes associated with the plurality of security domains.

17. The system of claim 14, wherein the determination that the volume ID is present on the volume list occurs before returning the address of the first node to the first client.

18. A non-transitory computer-readable storage medium containing instructions for controlling a computer system to perform operations comprising:
   binding a process to a wildcard address and a port on a redirector node that is part of a cluster;
   receiving a first request for a first address of a first volume located on the cluster from a first client, wherein the first request is sent to the port and a first address associated with a first virtual local area network (VLAN) that is not the wildcard address;
   determining the first address from the first request;
   determining a name of the first VLAN based on the first address;
   determining a first node that contains information regarding the first volume;
   determining an address of the first node that is part of the first VLAN based upon the name of the first VLAN;
   determining that a volume identifier (ID) associated with the first volume of the first request is present on a volume list; and
   returning, by the process on the redirector node, the address of the first node to the first client.

19. The non-transitory computer-readable storage medium of claim 18, wherein the determination that the volume ID is present on the volume list occurs before returning the address of the first node to the first client.

20. The non-transitory computer-readable storage medium of claim 18, wherein the operations further comprise receiving a request from a first client to access the first volume, and wherein the first request is an iSCSI discovery request.

* * * * *